United States Patent Office 3,580,959
Patented May 25, 1971

3,580,959
PROCESS AND APPARATUS FOR PROCESS CONTROL IN CRACKING FURNACES FOR THE THERMAL CRACKING OF HYDROCARBONS
Armin Dorner, Munich, Germany, assignor to Linde Aktiengesellschaft, Wiesbaden, Germany
Filed Oct. 12, 1967, Ser. No. 674,965
Claims priority, application Germany, Oct. 12, 1966,
P 15 68 966.4
Int. Cl. C07c 3/30; C07g 9/14, 9/20
U.S. Cl. 260—683                                    5 Claims

ABSTRACT OF THE DISCLOSURE

In cracking furnaces for hydrocarbons, having two heating zones—a radiation zone heated by combustion gases, and a convection zone heated by flue gases, the improvements of limiting the extent of preheating of the feed in the convection zone by: (A) water-cooled cooling coils in the convection zone; or (B) by passing a portion of the flue gases around the convection zone; or passing only a portion of the feed into the convection zone and mixing said portion with cold feed before entering the combustion zone.

---

Figure 1:
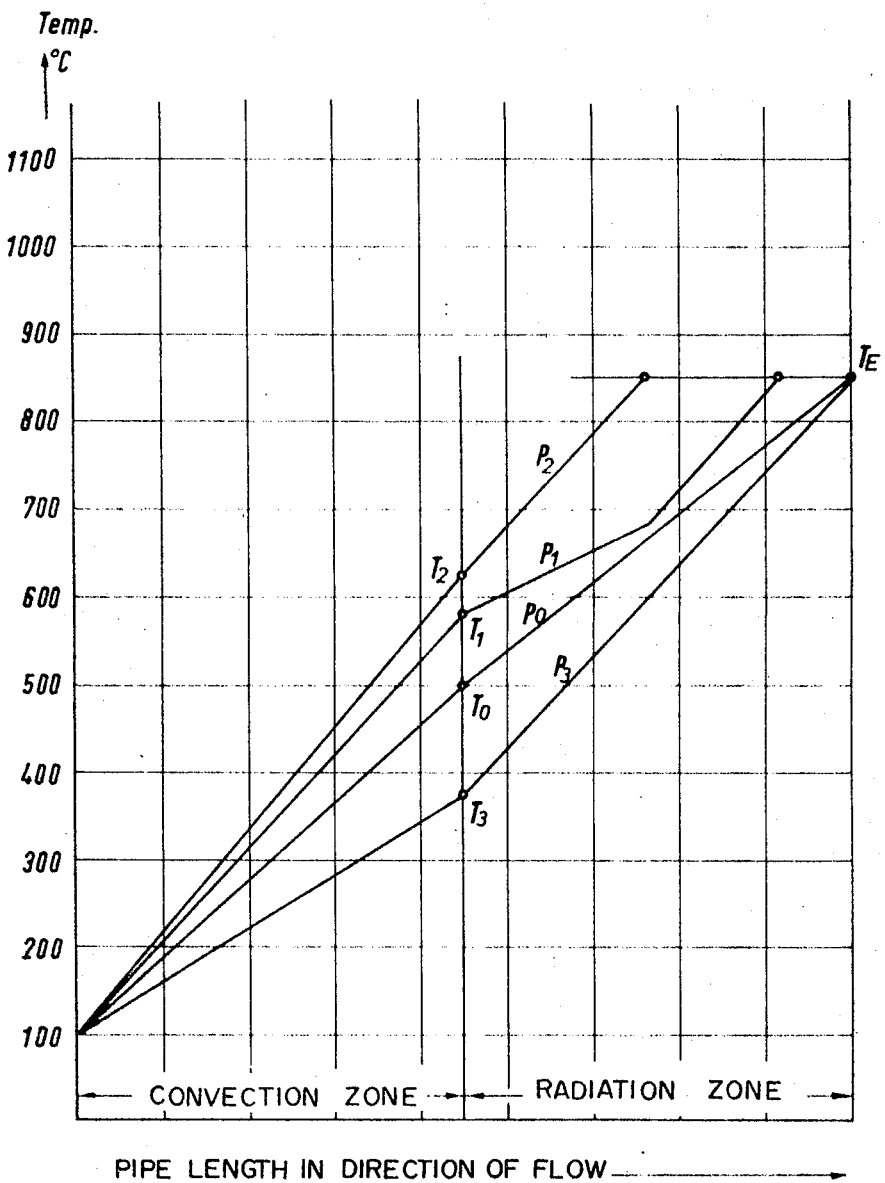

This invention relates to cracking furnaces, and in particular to a process and apparatus for controlling the thermal cracking of hydrocarbons, wherein the hydrocarbons are first preheated in a convection zone in pipes indirectly heated by hot flue gases and are then cracked in a radiation zone in pipes indirectly heated by combustion gases, at a higher temperature.

Modern cracking furnaces employed for the cracking of hydrocarbons normally consist of a radiation zone and a convection zone. Both zones are provided with horizontally or vertically mounted pipes through which the reactants (hydrocarbons and steam) are passed. The radiation zone is provided with burner nozzles either on the sides or at the bottom, so that the heat required for the cracking process can be produced by the combustion of fuel gases.

In order to utilize the remaining sensible heat in the flue gases after they have passed through the radiation zone, a convection zone is arranged on the flue gas side behind the radiation zone. Through this convection zone, the hot flue gases escape and preheat and/or evaporate the hydrocarbons to be cracked, and produce process steam and/or provide superheating.

Heretofore, development work towards improving such systems was concentrated chiefly on the radiation chamber. Thus, attempts were made to achieve as uniform a heating as possible, to decrease coking, and to increase the lifetime of the materials by as uniform an arrangement of the burners as possible and by an optimum division and arrangement of the pipes or tubes. Likewise, it is conventional, for controlling the cracking process in the radiation zone, to fire the burners or rows of burners to different degrees, or to subdivide the radiation zone into various chambers in order to achieve in this manner a certain regulation of the heat transferred at that point.

It is furthermore known that the procedure of the cracking reaction of the hydrocarbons is dependent upon the profile of the temperature forming within the convection zone and the radiation zone. In this connection, not only is the absolute value of the final temperatures of importance, but also the rate of change of the temperature between the convection zone and the radiation zone. Although a subdivision into chambers and/or a different charging of the burners offers several possibilities for adjusting the temperature profile in the cracking furnace, this profile is substantially fixed by the fixed dimensioning of the cracking furnace and the positive connection between the radiation zone and the convection zone on the flue gas side.

When attempting to change from a flat temperature slope to a steeper one, by altering the operating conditions in the radiation zone, a higher load upon the heating surfaces therein is necessary to obtain this steeper temperature curve. However, due to the higher load upon the heating surfaces, there results a poorer thermal efficiency of the radiation zone and thus a higher temperature of the flue gases exiting from the radiation zone into the convection zone. These higher waste gas temperatures, in turn, result in an increased preheating of the reactants in the convection zone, and thus dilute the effectiveness of a steeper temperature curve in the radiation zone by a higher transition temperature between the radiation zone and the convection zone. An additional factor which seriously mitigates against any advantage of this conventional measure of temperature increase in the radiation zone for obtaining a steeper temperature profile is that the admissible final temperature of the cracking process is reached long before the end of the pipe coil through which the reaction mixture flows, resulting in excessive residence times and overcracking.

Therefore, it is the object of the present invention to provide a process for regulating the temperature profile between the convection zone and the radiation zone, thereby to control the cracking process, independently of heating the radiation zone.

This object is attained, according to this invention, by positively controlling the transition temperature of the hydrocarbon mixture between the convection zone and the radiation zone by regulating the heat transmission in the convection zone.

The process of this invention thus represents a first-time intervention in a process for the thermal cracking of hydrocarbons at a point at which the temperature was previously dictated by the geometric relationships of the cracking furnace and the type and intensity of the heating in the radiation zone, and was substantially impossible to be influenced.

Although the main parameters in thermal cracking are the temperature and the residence time above a predetermined minimum temperature sufficient for the commencement of the cracking process (e.g. about 650° C. in the case of benzine), these parameters determining the degree of cracking are exchangeable within certain limits. To remain within the range of optimum operating conditions, i.e., for maximum yields of olefin at a predetermined final temperature, there is a maximum residence time which must not be exceeded. However, as mentioned above, not only the final temperature is of decisive importance for the progress of the reaction, but also the temperature profile of the reactants when flowing through the pipe coils arranged in the convection zone and in the radiation zone.

These relationships will now be explained in greater detail with reference to the diagram illustrated in FIG. 1.

In the diagram, there are entered on the abscissa the pipe length in the direction of flow of the reactants and on the ordinate the temperatures in ° C. Part of the total available pipe length is in the convection zone (left half of the diagram), the other part is in the radiation zone (right half of the diagram). The symbols $T_0$, $T_1$, $T_2$ and $T_3$ represent the temperatures during transition from the convection zone into the radiation zone, whereas $T_E$ is the final temperature of the cracking process.

If, for example, benzine is subjected to thermal cracking, in the cracking furnace exhibiting a relatively "flat" temperature profile ($P_0$), then there are produced—based on a constant yield of $C_2H_4$—during the cracking process more $CH_4$ and $C_{5+}$-hydrocarbons than in the case of a relatively "steep" temperature profile ($P_1$ and $P_2$, respectively). However, here, in turn, $C_2H_6$, $C_3H_6$, and the $C_4$-hydrocarbons are predominant. Therefore, by the transition from a flatter to a steeper temperature profile, the production of by-products ($CH_4$- or $C_{5+}$-hydrocarbons) is reduced in favor of the more valuable $C_2$-, $C_3$- and $C_5$hydrocarbons. In addition, there is an advantageous savings in energy, since the ratio of $H_2+CH_4/C_2H_4$, and thus the volume of gas to be compressed for obtaining the same amount of ethylene, is decreased.

The temperature profiles designated by $P_1$ and $P_2$ in FIG. 1 can be obtained with the previously known means, but in this connection, a temperature profile like $P_1$ can only be achieved when the radiation zone can be well controlled (subdivision of the radiation zone into several chambers and differing loads on the burner nozzles). For this purpose, it is necessary to raise the temperature in the radiation zone. Due to the fixed dimensioning of the convection zone and the positive connection between the radiation zone and the convection zone on the flue gas side, however, there results necessarily a higher temperature of the flue gases flowing from the radiation zone into the convection zone, and consequently an increased waste heat utilization and thus an increased preheating of the reactants in the convection zone. However, the increase in temperature in the transitional zone from $T_0$ to $T_1$ or $T_2$ has the effect that, as can be seen from FIG. 1, the final temperature $T_E$ of the reacting substances is reached long before the end of the pipe coil in the radiation zone, resulting in the undesired phenomenon of "overcracking."

In contradistinction thereto, the advantage of the present invention resides in making it possible to set a relatively steep temperature profile $P_3$ in the radiation zone, without having to suffer from the disadvantage of a premature arrival at the final reaction temperature.

This advantage is obtained by a positive regulation of the heat transferred to the reactants in the convection zone, whereby the temperature of the reactants is lowered in the transition zone to a temperature of, for example, $T_3$. Thus, in the process of this invention, the pipe length, which in the temperature profiles $P_1$ and $P_2$ cited as examples is, so to speak, "damaging" at the end of the pipe coil in the radiation zone, is utilized in the initial portion of the pipe coil in the radiation zone for preheating the reacting substances. This is coupled with the advantage that the maximum permissible final temperature of the reaction is reached only at the end of the pipe coil in the radiation zone.

According to one embodiment of this invention, a lower temperature of the reactants in the transition zone between the convection zone and the radiation zone is attained by a reduced supply of hot flue gases for the convection zone. This is done by branching off part of the hot flue gases flowing from the radiation zone in the direction of the convection zone before entering the convection zone and having this part bypass the latter zone. Thereby, the amount of heat transferred to the pipe coils in the convection zone and thus the temperature of the reactants flowing in the direction of the radiation zone are reduced. This aspect of the invention can be reduced to actual practice in a simple manner by providing one or more fuel gas stacks beside the convection zone.

According to a further embodiment of the invention, a lower temperature of the reactants in the transition zone can also be obtained by branching off part of the hydrocarbon-steam mixture before it is fed into the convection zone of the cracking furnace, and admixing such part to the portion preheated in the convection zone just before entering the radiation zone. In this embodiment, it is advantageous to measure the temperature of the mixture before entering the radiation zone and to use this temperature response to regulate the amount of the branched-off cracking mixture which does not flow through the convection zone.

The heat "bypassing" the convection zone in these two variants of the process can be recovered any time in a waste heat recovery apparatus connected thereafter, so that these processes are equivalent to conventional processes with respect to waste heat utilization.

According to another aspect of this invention, it is also possible to regulate the heating of the cracking mixture in the convection zone by the use of cooling means. For this purpose, an additional pipe coil is provided in the convection zone, which coil has a cooling medium flowing therethrough and absorbs a portion of the sensible heat of the hot combustion gases rising in the convection zone. Feed water has proven suitable in this connection, which removes the heat from the convection zone by evaporation. In accordance with a special idea of this invention, in this process, the amount of heat removed is regulated not only by the quantity of the feed water pumped therethrough, but also, in particular, by varying the feed water pressure.

The invention will be explained in further detail with reference to the embodiments schematically illustrated in FIGS. 2 to 4.

Figure 2A:
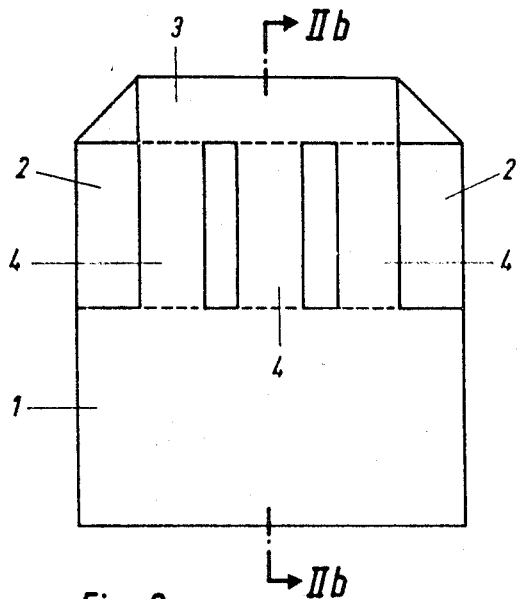
Figure 2B:
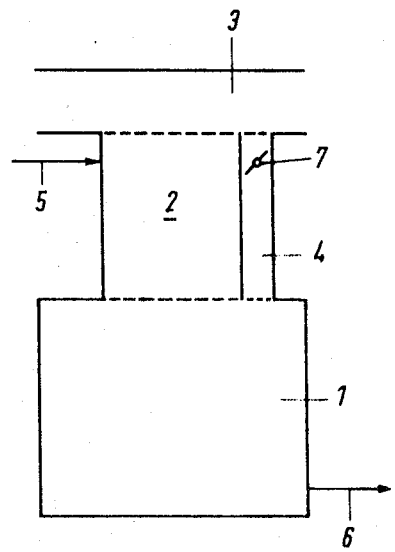
Figure 3:
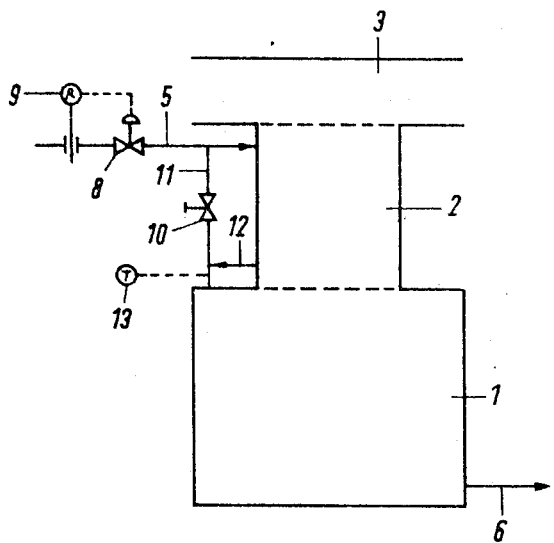
Figure 4:
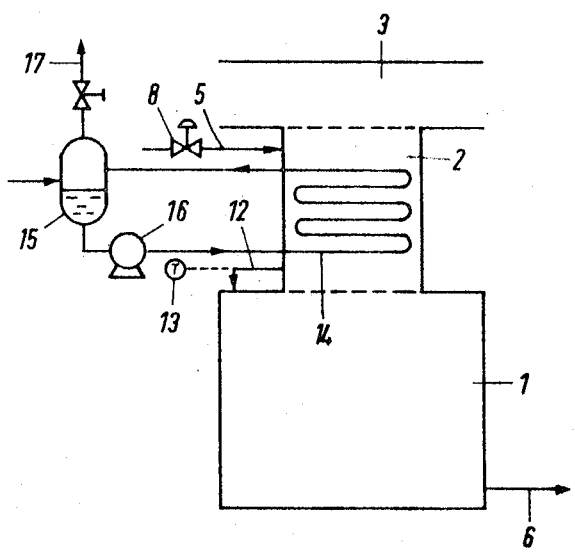

In FIGS. 2 to 4, the pipe coil systems arranged in the radiation and convection zones, through which the reactants are passed, are not illustrated so as to prevent confusion. Likewise, an illustration of the burner nozzles provided in the radiation zones, and which can be arranged at the bottom or on the side walls, is omitted; also there is no showing of the possible subdivision of the radiation zone into several heating chambers, since these technical features are familiar to any person skilled in the art and do not help to explain the invention. Thus, in the schematic illustrations described below, the pipe arrangements for conducting the reactants, as well as the means for heating the cracking furnace, are contained implicity as ordinary parts of such an arrangement. Additionally, it is of no importance for the present invention that the convection zone in FIGS. 2 to 4 is provided above the radiation zone. The invention is equally applicable to constructions wherein the convection zone is positioned beside or below the radiation zone.

FIG. 2a shows a cracking furnace for the thermal cracking of hydrocarbons, having a radiation zone 1 provided at the bottom and a convection zone 2 arranged thereabove, which latter zone is in communication, at the top, with a flue gas collecting channel 3. By the flue gas bypasses 4, a direct connection of the radiation zone with the flue gas collecting channel can be established.

FIG. 2b illustrates a section through the cracking furnace of FIG. 2a along line IIb. The reaction mixture (hydrocarbons and steam) is introduced into the cracking furnace by way of conduit 5. Then, the reaction mixture passes, from above to below, a pipe system provided in zones 1 and 2; in zone 2, at first a pre-warming or evaporation of the reactants takes place, and in zone 1, the reactants are reacted. The reaction products exit from the cracking furnace via conduit 6. The cracking furnace is fired solely in the radiation zone 1, and the hot waste gases then flow into the flue gas collecting channel 3, with a transfer of the sensible heat thereof to the pipe system in zone 2. In the convection zone 2, there is no heating of the pipe system carrying the reactants by radiation any more, but only a heating by convection.

Beside the convection zone 2, but separately therefrom, one or more flue gas bypasses 4 are provided, the effective cross-sectional area for flow being controllable by one or several control valves or dampers 7. With these bypasses, it is possible to conduct a portion of the flue gases rising from zone 1 past the convection zone, so that the reactants flowing through the pipe system of the convection zone 2 are prewarmed to a lesser extent, due to the smaller supply of heating gases from zone 1, than if the entire waste gas of zone 1 were to be passed through zone 2. The result is a lower temperature of the reactants in the zone of transition from zone 2 to zone 1.

FIG. 3 shows a further embodiment of the invention. The components identical to those in the preceding figures are provided with identical reference numerals. In this embodiment, for reducing the temperature of the reactants upon entering the cracking zone 1, a valve 8 is incorporated into line 5, which valve is controlled by the regulator 9. A bypass system is then provided downstream of valve 9, whereby a portion of the steam and/or of the hydrocarbons can be passed through conduit 11 provided with a control valve 10. This bypassed portion is then passed externally around the convection zone 2, and is admixed only shortly before entering the radiation zone 1 to the portion of the reactants previously preheated in the convection zone 2 and flowing through conduit 12, thus obtaining a lower mixing temperature. The mixing temperature thus set can be measured by a temperature sensing element 13, and the quantity of the cold reactants branched off through conduit 11 can thus be regulated in accordance with existing requirements.

A further embodiment of this invention is illustrated in FIG. 4, the components corresponding to those in the preceding figures again carrying identical reference numerals. In this embodiment, the convection zone 2 is provided with an additional pipe coil 14 through which feed water coming from the tank 15 can be pumped with the aid of the pump 16. This feed water can be evaporated in the pipe coil 14, and in the form of steam, is passed through conduit 17, to further uses. Due to the evaporation of the feed water, a portion of the heat is removed from the hot fuel gases flowing through the convection zone 2, so that the reactants entering the radiation zone 1 have this amount of heat missing from them. In this connection, the provision is made according to this invention to vary the heat removal, particularly by regulating the pressure of the feed water between 20 and 120 atmospheres absolute.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a cracking furnace comprising a radiation chamber, a flue gas collecting means and a convection chamber positioned therebetween, continuous pipe means extending serially through said convection chamber and radiation chamber, the radiation chamber being provided with heating means for heating said pipe means, feed conduit means outside of said convection chamber for passing feed hydrocarbons into said continuous pipe means disposed in said convection chamber, the improvement comprising connecting conduit means disposed externally of the convection zone in communication with said feed conduit means, and in further communication with a part of said continuous pipe means extending outside of the convection and radiation chambers at a point just before said continuous pipe means enters the radiation chamber, said connecting conduit means further comprising means for mixing at said point a portion of unheated feed hydrocarbons with hydrocarbons having traversed the convection zone and for permitting the resultant mixture to enter the radiation chamber.

2. A cracking furnace as defined by claim 1 further comprising means for measuring the temperature of said resultant mixture, and regulating means associated with said connecting conduit and being responsive to said temperature for regulating the amount of unheated hydrocarbons to be mixed with said hydrocarbons having traversed the convection zone.

3. In a process of operating cracking furnaces for the thermal cracking of hydrocarbons, wherein the hydrocarbons are first preheated in a convection zone having hot flue gases flowing therethrough and are then cracked in a radiation zone heated by combustion gases, at a higher temperature, the improvement which comprises branching off a portion of the hydrocarbon mixture fed to the convection zone at a point cooler than the convection zone, and re-mixing said branched-off portion with another portion which has been heated in the convection zone, said re-mixing being conducted at a point downstream of said convection zone, said branched-off portion being sufficient to control the transition temperature of the hydrocarbon mixture between the convection zone and the radiation zone, and passing resultant re-mixed portion directly to said radiation zone.

4. In a process of operating cracking furnaces for the thermal cracking of hydrocarbons, wherein the hydrocarbons are first preheated in a convection zone having hot flue gases flowing therethrough and are then cracked in a radiation zone heated by combustion gases, at a higher temperature, the improvement which comprises passing cooling water under pressure into said convection zone in indirect heat transfer relationship with said hot flue gases and said hydrocarbons in order to regulate the heat transfer in the convection zone so as to control the transition temperature of the hydrocarbon mixture between the convection zone and the radiation zone, the extent of heat removal obtained due to the evaporation of said water being regulated by the pressure on said water.

5. A process as defined by claim 4 wherein the pressure of said water is regulated between 20 and 120 atmospheres absolute.

References Cited
UNITED STATES PATENTS

| 2,051,335 | 8/1936 | Guyer | 208—132 |
| 2,114,544 | 4/1938 | Seguy | 208—132 |
| 2,332,051 | 10/1943 | Brandt | 208—132 |
| 2,557,569 | 6/1951 | Schutt | 23—277 |
| 2,736,685 | 2/1956 | Wilson et al. | 260—683 |
| 3,353,920 | 11/1967 | Kitzen | 208—132 |
| 2,852,440 | 9/1958 | Smith et al. | 208—132 |
| 2,890,256 | 6/1959 | King | 208—132 |

DELBERT E. GANTZ, Primary Examiner

C. E. SPRESSER, JR., Assistant Examiner

U.S. Cl. X.R.

23—277; 196—110; 208—106, 132